US008824360B2

(12) United States Patent
Muller et al.

(10) Patent No.: US 8,824,360 B2
(45) Date of Patent: Sep. 2, 2014

(54) PICOCELL AND CONTROL METHOD FOR WIRELESS DATA TRANSMISSION IN AN AIRCRAFT AS WELL AS THE AIRCRAFT

(75) Inventors: Jan Muller, Hamburg (DE); Heiko Trusch, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1024 days.

(21) Appl. No.: 12/126,399

(22) Filed: May 23, 2008

(65) Prior Publication Data

US 2009/0310529 A1 Dec. 17, 2009

Related U.S. Application Data

(60) Provisional application No. 60/939,620, filed on May 23, 2007.

(30) Foreign Application Priority Data

May 23, 2007 (DE) .......................... 10 2007 024 370

(51) Int. Cl.
H04B 7/185 (2006.01)
(52) U.S. Cl.
USPC .......................................................... 370/316
(58) Field of Classification Search
USPC .......................................................... 370/316
See application file for complete search history.

(56) References Cited

U.S. PATENT DOCUMENTS 7,715,853 B1 * 5/2010 Frerking et al. ........... 455/456.4
7,751,815 B2 * 7/2010 McKenna et al. ............. 455/431
7,907,578 B2 * 3/2011 Harvey et al. ................. 370/338
8,165,592 B2 * 4/2012 Soliman et al. ............... 455/447
2003/0160706 A1 8/2003 Endress et al.
2006/0270470 A1 * 11/2006 de La Chapelle et al. . 455/575.5
2007/0142053 A1 * 6/2007 Soliman et al. ............... 455/446
2007/0155381 A1 * 7/2007 Alberth et al. ............. 455/432.1
2007/0155421 A1 * 7/2007 Alberth et al. ............. 455/553.1
2007/0206522 A1 * 9/2007 Starke et al. .................. 370/316

(Continued)

FOREIGN PATENT DOCUMENTS

DE 102004034649 A1 2/2006
DE 102006036082 A1 2/2008

(Continued)

OTHER PUBLICATIONS

German Examination Report dated Mar. 10, 2008.

(Continued)

Primary Examiner — John Blanton
Assistant Examiner — Jay P Patel
(74) Attorney, Agent, or Firm — Jenkins, Wilson, Taylor & Hunt, P.A.

(57) ABSTRACT

A picocell in an aircraft for the wireless transmission of data between at least a mobile station in the aircraft and a base station in the aircraft in which a communications connection between the at least one mobile station in the aircraft and a subscriber in a terrestrial communications network is established via the base station. In order to enable passengers automatically the use of their mobile radio devices, when no risk of danger to the flying operation is to be expected, or otherwise to refer them to a corresponding ban, a flight control device is provided for detecting flight data and for setting up the picocell in dependence on the flight data.

6 Claims, 2 Drawing Sheets

(56) References Cited

U.S. PATENT DOCUMENTS

2008/0004040 A1* 1/2008 Bogart .................. 455/456.1
2008/0141314 A1* 6/2008 Lemond et al. ................ 725/76
2009/0017819 A1* 1/2009 Fox et al. .................. 455/435.1
2011/0116373 A1* 5/2011 Lauer ........................... 370/232
2011/0134889 A1* 6/2011 Harvey et al. ................ 370/335

FOREIGN PATENT DOCUMENTS

EP 0344389 A1 6/1989
WO 2007022418 2/2007
WO 2008005098 A2 1/2008

OTHER PUBLICATIONS

German Examination Report dated Sep. 26, 2008.

International Search Report and Written Opinion dated Dec. 1, 2009.

* cited by examiner

PICOCELL AND CONTROL METHOD FOR WIRELESS DATA TRANSMISSION IN AN AIRCRAFT AS WELL AS THE AIRCRAFT

CROSS REFERENCE TO RELATED APPLICATION

This application claims priority to, and the benefit of, U.S. Provisional Patent Application Ser. No. 60/939,620, filed on May 23, 2007, the disclosure of which is incorporated herein by reference in its entirety.

BACKGROUND

1. Field

The disclosed embodiments relate to the construction and operation of a picocell in an aircraft for the wireless transmission of data between at least one mobile station in the aircraft and a base station in an aircraft and to an aircraft having at least one such picocell.

2. Brief Description of Related Developments

In the prior art various different methods and systems are known for enabling passengers in aircraft or on board ships to have mobile communications. This can be the use of telephone appliances, by way of example according to GSM standard, or also of data processing appliances such as laptops or PDAs (personal digital assistants, pocket computers), which have a WLAN (wireless LAN, wireless computer network) interface. When operating cellular mobile radio networks in aircraft a communication takes place between a mobile terminal device in the aircraft, more particularly a mobile radio telephone, and a local mobile radio network (picocell). An ongoing connection into terrestrial networks normally takes place via satellite communications systems. A system is thus provided which enables passengers in a suitably equipped aircraft to conduct telephone calls in a terrestrial communications fixed network from the aircraft.

A method of this kind for operating mobile terminal devices which can be operated in mobile radio networks in transportation means located in space, more particularly aircraft, is described by way of example in DE 10 2004 034 649. With this prior art a communications connection between at least one mobile terminal device located in a transportation means located in space, and one mobile radio network is established by using at least one frequency band provided for aviation purposes.

The electronics in the aircraft for controlling the aircraft can however be very sensitive in their reaction to interferences from an on-board mobile radio network. For this reason passengers are today asked to switch off their mobile radio devices during the flight or to switch them to a purely passive operating state in which they send out no radiation. The passengers and crew members are informed about this by means of suitable announcements or fixed signs (e.g. stickers).

In future however mobile radio networks are also to be set up on board aircraft in order to enable the passengers to have communications connections to the outside even during the flight. The mobile radio devices must only then not be operated if there is a risk of interferences, thus in particularly critical flight phases such as take-off and landing. In other words there are in the next-generation picocells on board an aircraft, flight phases in which the mobile radio devices can be used, and there are flight phases in which the mobile radio devices must not be used.

In the next-generation picocells on board an aircraft the passengers must be notified according to the flight phase as to whether they are permitted to use their mobile radio device or not. An announcement which would have to be made each time for this purpose means additional work for the crew members and is annoying for the passengers who are not affected by the announcement and who do not even want to use their mobile radio devices. There is thus today not the flexibility of signalling to the passengers whether the use of mobile telephones and data terminal devices is currently permitted or not permitted or is possible or not possible.

From EP 0 344 389 a method and apparatus are known for controlling an aircraft. The method thereby comprises the steps: monitoring one or more parameter signals which are characteristic for one or more parameters relating to the aircraft, and identifying the current status of the aircraft at that time according to predetermined status criteria which are defined by the strengths of one or more of the monitored parameter signals wherein the status at that time is one of several predetermined operating states of the aircraft. The signal about the current status at that time is stored in a non-volatile memory means, one or more control signals for the aircraft are supplied. After an interruption in the electrical power the stored signal about the current status at that time is retrieved from a non-volatile memory means, and one or more control signals for the aircraft are supplied which are dependent at least in part on the retrieved signal about the current status at that time.

From the prior published DE 10 2006 036 082 A1 a control apparatus for screening a space is known which screens a space from penetrating signals. For this it has a receiving device, a jamming device and a transmitting device. With the receiving device transmission signals are received from which an interfering signal is determined in order to break down the transmission signal. This interfering signal is radiated via the transmission device.

SUMMARY

The aspects of the disclosed embodiments is to provide a solution with which the drawbacks of the prior art can be overcome and with which passengers are automatically allowed to use their mobile radio devices when no danger to the flight operation is to be expected, and on the other hand are advised of a corresponding ban, respectively.

This is achieved by providing a picocell according to the subject matter herein, an aircraft with a picocell of this kind according to the subject matter herein, and a method for operating a picocell of this kind according to the subject matter herein. Preferred embodiments form the subject of the relevant dependent claims.

The disclosed embodiments are based on coupling the control of the picocell, i.e. switching the picocell on and off, with the relevant flight phase and precisely controlling the displays for the availability of the picocell for the users and passengers respectively dependent on the relevant flight phase. This provides a fully automatic control of the cellular mobile radio network in the aircraft.

The picocell according to the disclosed embodiments in an aircraft for the wireless transmission of data between at least one mobile station in the aircraft and a base station in the aircraft wherein a communications connection is established between the at least one mobile station in the aircraft and a subscriber in a terrestrial communications network via the base station is characterised by an aircraft control device for detecting flight data and for setting up the picocell in dependence on the aircraft data.

More particularly the picocell is provided on board the aircraft after the aircraft control device has sent to the base station a command to switch on the base station.

Furthermore the aircraft control device is preferably connected to at least one display device in the aircraft which is disposed for displaying the availability of the picocell.

More particularly the at least one display device is integrated in a PSU above the seats.

The aircraft according to the disclosed embodiments having at least one picocell for the wireless transmission of data between at least one mobile station and a base station in the aircraft in which a communications connection is established via the base station between the at least one mobile station in the aircraft and a subscriber in a terrestrial communications network is characterised in that an aircraft control device is provided for detecting flight data and for setting up the at least one picocell in dependence on the flight data.

More particularly several picocells can be located on board in the aircraft.

The corresponding method according to the disclosed embodiments for operating a picocell in an aircraft for the wireless transmission of data between at least one mobile station and a base station in the aircraft wherein a communications connection is established via the base station between at least one mobile station in the aircraft and a subscriber in a terrestrial communications network, has the steps: checking by an aircraft control device whether a safe flight phase has been reached, and switching on the base station by the aircraft control device when the safe flight phase is reached, and activating prohibition signs by the aircraft control device when the safe flight phase is not reached.

More particularly the base station is switched off when the safe flight phase is not reached.

Clearance signs are preferably activated after the communications connection between the base station and the terrestrial communications network has been established.

One advantage of the method according to the disclosed embodiments is that passengers are offered a better service since they are informed directly, i.e. without time delay and flexibly about the (temporary) usability of mobile terminal devices. When used on board aircraft certification and licensing agreements are brought into line with mobile radio on board.

Further features and advantages of the disclosed embodiments are apparent from the following description of embodiments in which reference is made to the accompanying drawings.

DETAILED DESCRIPTION OF THE DRAWINGS

Figure 1:
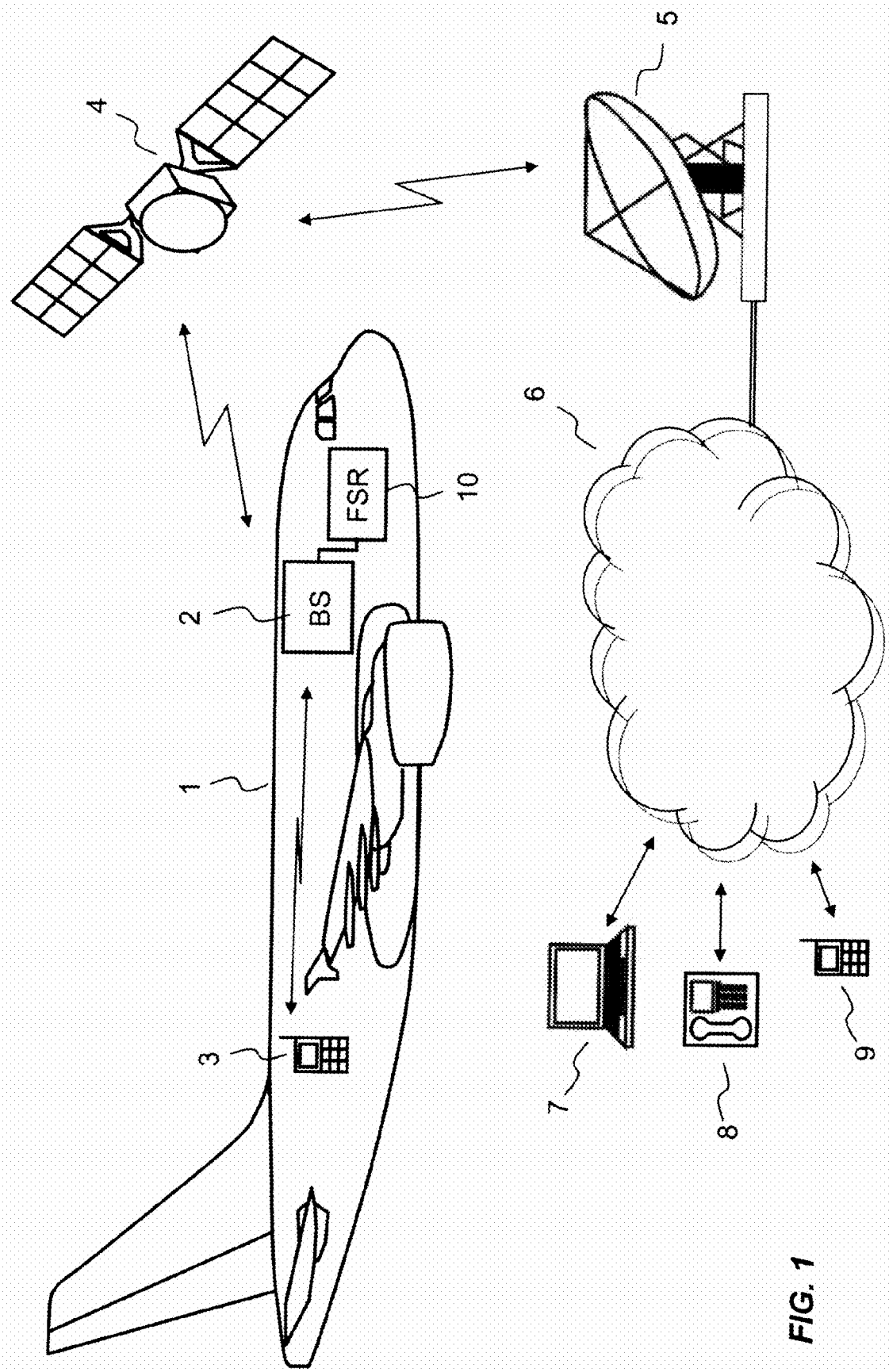
FIG. 1 shows an embodiment of the picocell according to the disclosed embodiments on board an aircraft.

FIG. 1 shows an aircraft 1 which is fitted with a base station 2, BS. With this base station 2 a picocell can be set up in the passenger cabin of the aircraft 1 and can be made available to the passengers for the transmission of data via their mobile radio devices 3. In particular the mobile radio devices 3 of the passengers are mobile telephones which operate according to the GSM standard for example. These can however also equally well be portable computers or PDAs which communicate via a corresponding WLAN or UMTS network.

In practice data are transferred wirelessly inside the picocell in the aircraft between the mobile station 3 and the base station 2. A communications connection to a terrestrial communications network 6 is established via the base station 2 independently of the one or the several mobile stations in the aircraft. This takes place as a rule via a link to a satellite 4. The satellite 4 is in turn connected to the terrestrial communications network 6 by a satellite receiver aerial 5 of a base station. The terrestrial communications network 6 connects several subscribers to one another. The terrestrial communications network 6 can thereby be part of a data transmission network with connected computers 7; the terrestrial communications network 6 can alternatively be part of a fixed network for telephony to which the landline telephones 8 are connected; and the terrestrial communications network 6 can be part of a terrestrial mobile radio network into which the mobile radio telephones 9 can log in. Conversely the terrestrial communications network 6 can comprise as one complete network the said networks as partial networks. In this way a connection can be produced between the at least one mobile station 3 and a subscriber 7, 8, 9 in one or more terrestrial communications networks.

The use of mobile radio devices is restricted on the part of the airline company owing the risk of interfering with the flight electronics in the aircraft. In particular this concerns a time restriction, in other words the use is permitted only outside of the critical flight phases such as take-off and landing. Furthermore the use of mobile radio devices can be cleared in the manner where the mobile radio devices are located in the active state outside of the range of the base stations and picocells on the ground in order to prevent the mobile radio devices from logging into terrestrial picocells. This is achieved if the use of the mobile radio devices is only cleared from a certain flying height.

According to the disclosed embodiments the clearance for the mobile radio devices is automated in dependence on the relevant flight phase in that the base station 2 is only activated when it receives a corresponding clearance signal from a flight control computer 10, FSR. Furthermore the activation of the base station 2 and thus the provision of the picocell are notified to the passengers via a corresponding display.

The display is preferably integrated in the PSU (passenger supply unit) above the seats, similar to the known fasten seat belt sign. In detail the display can be changed by an on/off switch background lighting, or it can comprise an active display, by way of example an LCD display, with which the changeable signs can be illustrated, which comprise by way of example in diagrammatic form the illustration of a data terminal device such as a PDA, smartphone or laptop or a text message referring to the clearance or ban on the use of mobile telephones or data terminal devices (e.g. "No GSM", "No mobiles", "telephone use prohibited", "telephoning possible" etc). In this way it can be displayed—as a pictogram or as text—whether the use of mobile telephones or data terminal devices is currently permitted or not permitted. According to the disclosed embodiments this statement is linked to whether a connection to a terrestrial network at the given moment in time is at all possible or not possible.

The display unit (not shown) can for this be fundamentally connected directly to the flight control unit 10 for detecting flight data so that the display is controlled directly by the flight control. The display unit can however equally well be connected to the base station 2 so that it is "connected in series" with the picocell. In each case it shows the availability of the picocell in dependence on the flight data.

Figure 2:
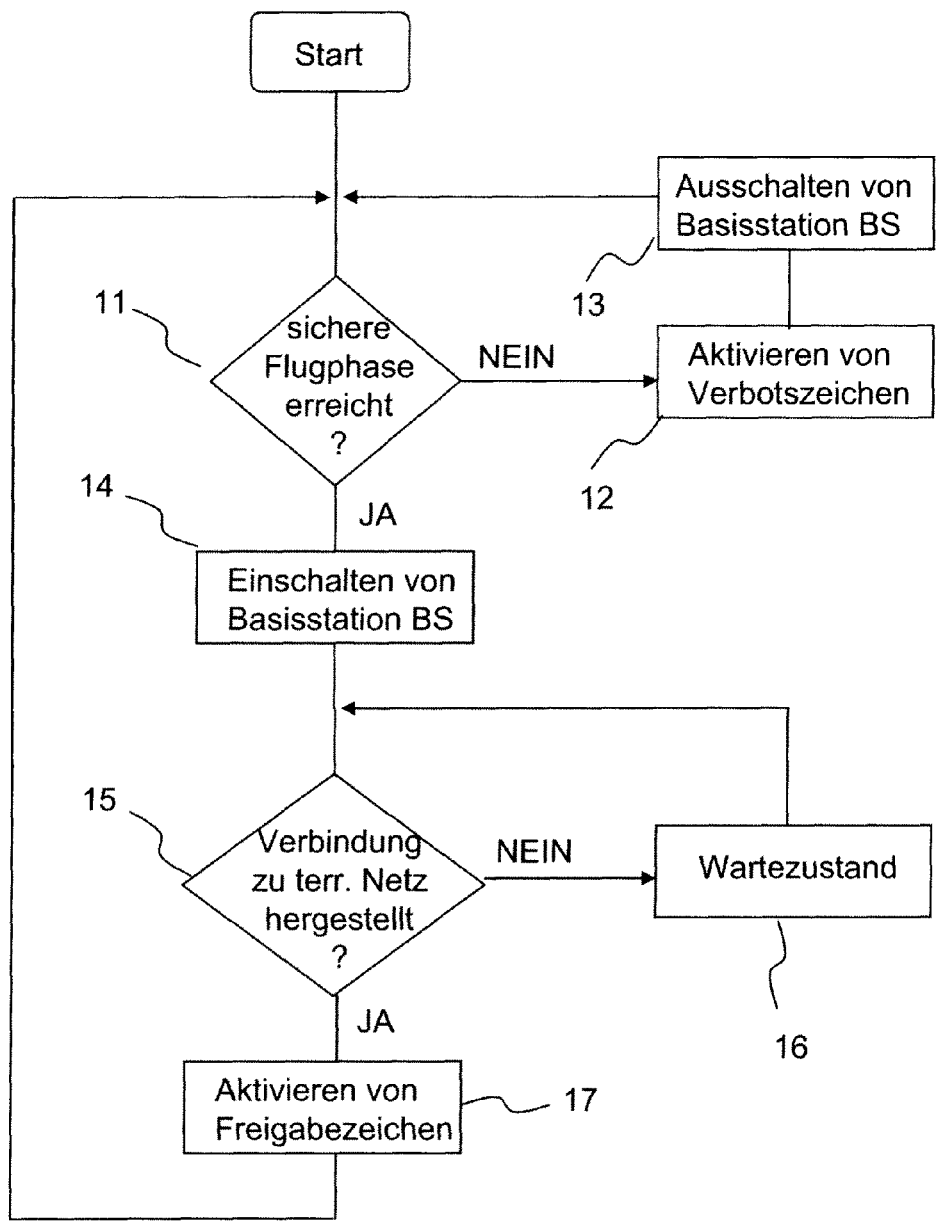
FIG. 2 shows an embodiment of the method according to the disclosed embodiments for operating a picocell according to FIG. 1.

The method for controlling both the switching on of the picocell itself and also the activation of the associated display for the passengers is shown in a preferred embodiment in FIG. 2 in which the display of the picocell is "connected in series".

After the start of the method which can be triggered by way of example when moving the aircraft into its take-off position, it is checked in step 11 whether the aircraft has reached a safe flying phase. This can be when the aircraft is located at a predetermined height above the ground. It can however equally be when the aircraft is in a holding position on the ground—even for a longer period of time. In each case a safe flying phase is characterised in that the electronics of the aircraft cannot be disturbed by the operation of mobile radio devices on board the aircraft. Should the aircraft not yet have reached a safe flying phase prohibitory signs present in the passenger cabin are activated to prohibit the switching on of mobile radio devices. This process takes place in step 12. At the same time or immediately afterwards the base station 2 is switched off, if it was previously switched on, i.e. if the aircraft coming from a safe flying phase enters into a critical flying phase. This process takes place in step 13.

If the aircraft on the other hand is located in the safe flying phase as regards electromagnetic interference, then the base station 2 is automatically switched on in step 14 and thus the picocell 2 is provided on board the aircraft. The command for switching on the base station 2 is released by the FSR 10 which for this calls up the relevant flight data to which it has access as central control for the flight. Following this a connection is established between the base station 2 on board the aircraft and a predetermined terrestrial communications network. This can take a certain amount of time and therefore it is checked in step 15 whether the connection is already existing. If this is not yet the case then in step 16 the method is stopped for a predetermined period of time, i.e. is set into a time-restricted holding state. After this predetermined period of time it is checked again whether the connection could be made to a terrestrial network. If this connection has happened then in step 17 it is notified to the passengers via a display, i.e. the clearance sign for use of mobile radio devices is activated.

In order to be able to detect automatically the return of the aircraft into a flying phase in which the use of mobile radio devices represents a danger risk, after activation of the clearance sign in step 17 the method reverts back to step 11 in which it is checked whether a safe flying phase has been reached.

In addition to the automatic control of the display described here through on-board computers and other flight control systems 10 the picocell according to the disclosed embodiments preferably has the possibility that the display can be manipulated by means of input units (not shown). These input units can comprise units which are located outside of the aircraft or vehicle and which are connected wire-linked or non wire-linked to the aircraft or vehicle; they can equally well comprise the manual control by crew personnel, e.g. cabin crew, who are working in the passenger cabin; they can also comprise devices via which the manual control is undertaken by the or each vehicle driver or aircraft captain, e.g. the cockpit crew. The display can thus be changed from time to time in order to signal the currently valid status.

Obviously the disclosed embodiments are not restricted to one picocell on board an aircraft, it can equally be applied and offers practically the same or identical advantages over the prior art when more than one picocell is located on board an aircraft, e.g. two picocells. Furthermore the disclosed embodiments are not restricted to aircraft. It can be used in all means of transportation in which the use of mobile radio devices by passengers is permitted only under certain conditions. These are in particular rail and water craft as well as motor vehicles. Furthermore these are those means of transportation which are equipped with equipment which improve the use of mobile radio devices, i.e. which have so called repeaters or other transmitting/receiving systems installed in the vehicles.

REFERENCE NUMERALS

1 Aircraft
2 Base station
3 Mobile station
4 Satellite
5 Satellite receiver aerial
6 Terrestrial communications network
7 Computer
8 Landline telephone
9 Mobile telephone
10 Aircraft control computer
11 Enquiry: safe flying phase reached?
12 Process: activating prohibition signal
13 Process: switching off picocell
14 Process: switching on picocell
15 Enquiry: connection to terrestrial network produced?
16 Process: holding state
17 Process: activating clearance sign
BS Base station in mobile radio network
FSR Flight control computer or equipment

The invention claimed is:

1. A picocell in an aircraft for the wireless transmission of data between at least one mobile station in the aircraft and a base station in the aircraft, wherein a communications connection between the at least one mobile station in the aircraft and a subscriber in a terrestrial communications network is established via the base station and
   wherein a flight control device is provided for detecting flight data and for automatically switching the base station off and on in dependence on the flight data in order to set up the picocell if a safe flying phase is reached and to switch off the picocell if the safe flying phase is not reached,
   wherein the flight control device is connected to at least one display unit in the aircraft and adapted to control the at least one display unit to:
      activate clearance signs clearing use of the at least one mobile station if the safe flying phase is reached and the communications connection has been established between the base station and the terrestrial communications network, and
      activate prohibition signs prohibiting use of the at least one mobile station if the safe flying phase is not reached.

2. The picocell according to claim 1 which is provided on board the aircraft, after the flight control device has sent a command to the base station to switch on the base station.

3. The picocell according to claim 1 in which the at least one display device is integrated in a passenger supply unit (PSU) above the seats.

4. An aircraft with at least one picocell for the wireless transmission of data between at least a mobile station and a base station in the aircraft, wherein a communications connection is set up between the at least one mobile station in the aircraft and a subscriber in a terrestrial communications network via the base station,
   wherein a flight control device is provided for detecting flight data and for automatically switching the base station off and on in dependence on the flight data in order to establish the at least one picocell if a safe flying phase is reached and to switch off the picocell if the safe flying phase is not reached, and wherein the aircraft further comprises at least one display unit connected to the flight control device, wherein the flight control device is adapted to control the at least one display unit to:

activate clearance signs clearing use of the at least one mobile station if the safe flying phase is reached and the communications connection has been established between the base station and the terrestrial communications network, and activate prohibition signs prohibiting use of the at least one mobile station if the safe flying phase is not reached.

5. The aircraft according to claim 4 wherein several picocells are set up on board.

6. A method for operating a picocell in an aircraft for the wireless transmission of data between at least a mobile station and a base station in the aircraft wherein a communications connection between the at least one mobile station in the aircraft and a subscriber in a terrestrial communications network is established via the base station, the method comprising:

checking by a flight control device whether a safe flying phase is reached, and automatically switching on the base station by the flight control device when the safe flying phase is reached, and automatically switching off the base station by the flight control device and activating a prohibition sign by the flight control device, when the safe flying phase is not reached, wherein clearance signs are activated after the communications connection has been established between the base station and the terrestrial communications network.

* * * * *

UNITED STATES PATENT AND TRADEMARK OFFICE
CERTIFICATE OF CORRECTION

PATENT NO. : 8,824,360 B2  
APPLICATION NO. : 12/126399  
DATED : September 2, 2014  
INVENTOR(S) : Jan Müller and Heiko Trusch Page 1 of 1

It is certified that error appears in the above-identified patent and that said Letters Patent is hereby corrected as shown below:

On the Title Page

Item (12) "Muller" should read "Müller".

Item (75) the first-named inventor's name should read "Jan Müller" rather than "Jan Muller".

Signed and Sealed this
Second Day of June, 2015

Michelle K. Lee
*Director of the United States Patent and Trademark Office*